(12) United States Patent
Begin

(10) Patent No.: US 7,865,317 B2
(45) Date of Patent: Jan. 4, 2011

(54) SYSTEM AND METHOD FOR MEASURING A FUEL LEVEL IN A VEHICLE FUEL TANK

(75) Inventor: Donald R. Begin, White Lake, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 113 days.

(21) Appl. No.: 12/331,496

(22) Filed: Dec. 10, 2008

(65) Prior Publication Data

US 2010/0145638 A1 Jun. 10, 2010

(51) Int. Cl.
G01F 23/00 (2006.01)

(52) U.S. Cl. .............................. 702/55; 702/33; 702/50; 702/100; 702/141; 73/290 V; 73/64.53; 73/64.55; 181/124; 340/612

(58) Field of Classification Search .................... 702/33, 702/50, 55, 100, 141; 73/290 V, 64.53, 64.55; 181/124; 340/612
See application file for complete search history.

(56) References Cited

U.S. PATENT DOCUMENTS 6,588,269 B1 * 7/2003 Benghezal et al. ........ 73/290 V

2005/0155417 A1 * 7/2005 Emord ........................ 73/113
2006/0027017 A1 * 2/2006 Kamatsuke ............... 73/290 R

* cited by examiner

Primary Examiner—Sujoy K Kundu
(74) Attorney, Agent, or Firm—Lionel D. Anderson; Reising Ethington P.C.

(57) ABSTRACT

A fuel measurement system and method that can determine the fuel level in a vehicle fuel tank, even when the fuel is sloshing, splashing, or experiencing other dynamic conditions. Generally speaking, the system and method use different fuel measuring techniques to address different fuel tank conditions. For example, during normal conditions a traditional fuel level sensor may be used. During dynamic conditions, such as when the vehicle is experiencing significant acceleration, maneuvering, inclination, yaw rate, etc., the system may employ other measuring techniques that are better suited to address such an environment. One measuring technique that may be used is a consumption-based technique that uses fuel usage signals from one or more fuel injector sensor(s) to determine the amount of fuel consumed, and then subtracts that amount from a previous fuel level reading.

16 Claims, 2 Drawing Sheets

SYSTEM AND METHOD FOR MEASURING A FUEL LEVEL IN A VEHICLE FUEL TANK

TECHNICAL FIELD

The present invention generally relates to fluid level measuring and, more particularly, to a system and method for measuring a fuel level in a vehicle fuel tank where the fuel is experiencing sloshing, splashing or other dynamic conditions.

BACKGROUND

Various fluid level measuring systems have been used to determine the fuel levels in vehicle fuel tanks. In most applications, a fuel level measuring system typically includes a measuring unit and a fuel gauge. The measuring unit (e.g., a sending unit) measures the fuel level and sends electronic signals representative of the fuel level to the fuel gauge for display. Depending on the particular application, signal filtering techniques may be used to accommodate several conditions and reduce inaccurate and fluctuating fuel level readings.

SUMMARY OF THE INVENTION

According to one embodiment, there is provided a method for measuring a fuel level in a vehicle fuel tank. The method may comprise the steps of: (a) using a first measurement technique to determine a first reading; (b) determining if dynamic conditions exist in the vehicle fuel tank; (c) if dynamic conditions exist in the vehicle fuel tank, then using a second measurement technique to determine a second reading; and (d) using both the first and second readings to determine the fuel level in the vehicle fuel tank.

According to another embodiment, there is provided a method for measuring a fuel level in a vehicle fuel tank. The method may comprise the steps of: (a) determining if dynamic conditions exist in the vehicle fuel tank; (b) receiving a fuel usage signal from a fuel injector sensor; and (c) if dynamic conditions exist in the vehicle fuel tank, then using the fuel usage signal and a consumption-based technique to determine the fuel level in the vehicle fuel tank.

According to another embodiment, there is provided a system for measuring a fuel level in a vehicle fuel tank that may comprise: a yaw rate sensor, a fuel level sensor, a fuel injector sensor, and a fuel system control module. The fuel system control module uses the yaw rate signal to select between a first measurement technique that determines the fuel level in the vehicle fuel tank with the use of a fuel level signal, and a second measurement technique that determines the fuel level in the vehicle fuel tank with the use of a fuel usage signal.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
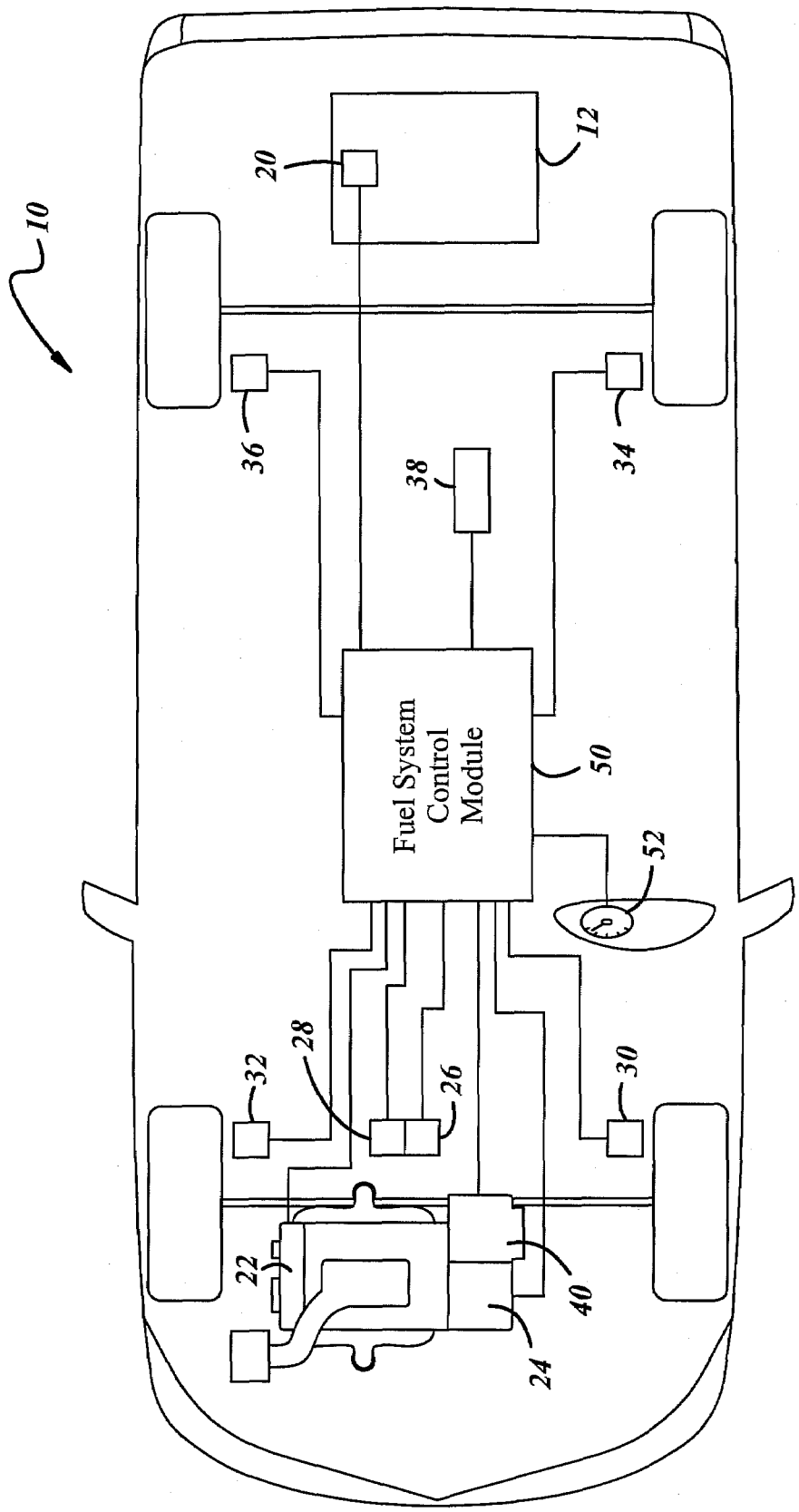
FIG. 1 is a schematic view of an exemplary system for measuring the fuel level in a vehicle fuel tank.

With reference to FIG. 1, there is shown an exemplary fuel measurement system 10 that can determine the fuel level in a vehicle fuel tank 12, even when the fuel is sloshing, splashing, or experiencing other dynamic conditions. Generally speaking, fuel measurement system 10 uses different fuel measuring techniques to address different fuel tank conditions. For example, during normal conditions the fuel measurement system may use a traditional fuel level sensor and standard filtering techniques. During dynamic conditions, such as when the vehicle is experiencing significant acceleration, maneuvering, inclination, etc., the system may employ other measuring techniques that are better suited to address unstable fuel conditions. Although the following description is in the context of a particular fuel measurement system, it should be appreciated that this system is merely exemplary and that other systems known in the art could also be used. According to this particular embodiment, fuel measurement system 10 includes sensors 20-40, a fuel system control module 50, and a fuel gauge 52.

Any number of different sensors, components, devices, modules, etc. can be used to provide fuel measurement system 10 with information that may pertain to conditions within fuel tank 12 or elsewhere in the vehicle. These include, for example, a fuel level sensor 20, a transmission sensor 22, an engine output sensor 24, a vehicle acceleration sensor 26, a yaw rate sensor 28, vehicle speed sensors 30-36, an incline sensor 38, and one or more fuel injector sensors 40, to name a few. It should be appreciated that one or more of the aforementioned sensors could be embodied in hardware, software or some combination of both, and that they can be electronically coupled to fuel system control module 50 via a direct electronic connection (as is schematically illustrated in FIG. 1), through other electronic components such as modules, over a vehicle communications bus or network, or according to some other connection known in the art.

Fuel level sensor 20, which may be located inside or outside of fuel tank 12, takes fuel level readings and provides those readings to fuel system control module 50. There are a number of different types of fuel level sensors that could be used. For example, non-contact-type fuel level sensors that have ultrasonic or radio frequency (RF) sensors could be used, as well as contact-type fuel level sensors such as those that have floats connected to resistive elements. Skilled artisans are familiar with these and other designs, thus, a thorough description of their structure and function has been omitted here. Different fuel level sensor types typically have different operational characteristics. For instance, when a fuel tank is full, the float on a contact-type sensor may be submerged such that it does not start to sink until the fuel level drops to near the bottom of the float. The fuel level readings do not change until the float starts to sink, which could be at some point after when the fuel level begins to go down. Furthermore, a contact-type sensor may not have a range of motion that extends all the way down to the bottom of the fuel tank; thus, the float may reach the end of its travel while there is still fuel left in the fuel tank. Skilled artisans will appreciate that the fuel measurement system and method described herein is not limited to any one particular fuel level sensor, as a number of different sensor types could be employed.

Transmission sensor 22 may include any combination of hardware and/or software components capable of providing a transmission signal that is indicative of the present state of the vehicle transmission. For instance, transmission sensor 22 may include an actual sensor that is located within the vehicle power train and determines if the vehicle is in a first, second, third, fourth gear, etc. In another embodiment, transmission sensor 22 may be mounted near the gear shifter so that it can determine if the vehicle is in 'park', 'reverse', 'neutral', 'drive', etc. Transmission sensor 22 can be utilized by an engine control module (ECM) or some other existing vehicle electronic module; in such an embodiment, fuel system control module 50 could simply receive a transmission signal from the ECM, etc. Transmission sensor 22 is not the only sensor that may provide fuel system control module 50 with information relating to current vehicle operating conditions; other sensors such as an engine output sensor, an acceleration sensor, a yaw rate sensor, a vehicle speed sensor, an incline sensor, etc. could also be used. These, as well as any other sensors that are typically used in a vehicle electronic stability control (ESC) system, may provide fuel system control module 50 with pertinent vehicle information.

Engine output sensor 24 may include any combination of hardware and/or software components capable of providing an engine output signal that is indicative of the mechanical output of the engine. Depending on the particular embodiment, engine output sensor 24 may be an actual sensor that measures engine torque, engine speed, or some other engine output parameter; or it may be embodied in software and use empirically-based lookup tables or some other data structure to determine engine output. In one example, an actual torque sensor may be mounted at one or more points along an input shaft, an output shaft, or both in the vehicle's power train. Regardless of whether engine output sensor 24 is an actual sensor or is embodied in software, it may provide fuel system control module 50 with engine output readings that are indicative of engine operating conditions. It is possible for the engine output signal to be provided to the fuel system control module 50 by an engine control module (ECM).

Acceleration sensor 26 may include any combination of hardware and/or software components capable of providing an acceleration signal that is indicative of the acceleration being experienced by the vehicle. This may include longitudinal and/or lateral acceleration sensors. Lateral acceleration is sometimes noticeable as a centrifugal force moving a vehicle to the outside of a curve when a vehicle is cornering, for example. In one embodiment, acceleration sensor 26 includes a lateral accelerometer that is co-located in the same housing as yaw rate sensor 28 or is integrated together as one unit. Some examples of suitable acceleration sensor types include microelectromechanical system (MEMS) type sensors and tuning fork-type sensors, although any type of acceleration sensor may be used. It is possible for the acceleration signal to be provided to the fuel system control module 50 by an engine control module (ECM).

Yaw rate sensor 28 may include any combination of hardware and/or software components capable of providing a yaw rate signal that is indicative of the yaw rate being experienced by the vehicle. In general, the 'yaw rate' is a measurement of the vehicle's angular velocity around its vertical axis and it is usually expressed in degrees or radians per second. Yaw rate sensor 28 may be a stand alone sensor, it may be integrated within the same housing as acceleration sensor 26 or some other device, and it may be used to provide other devices—in addition to fuel system control module 50—with information. Two such devices are a vehicle electronic stability control (ESC) system and a brake control module, which may use input from yaw rate sensor 28. In one particular embodiment, yaw rate sensor 28 is mounted in the passenger compartment under the center console and can include a gyroscopic device, as is known in the art. It is possible for the yaw rate signal to be provided to the fuel system control module 50 by an electronic stability control (ESC) system or a brake control module (e.g., an ABS control module).

Vehicle speed sensors 30-36 may include any combination of hardware and/or software components capable of providing a vehicle speed signal that is indicative of the vehicle's speed or velocity. In one embodiment, vehicle speed signals are derived or calculated from acceleration signals, such as those mentioned above (skilled artisans appreciate the relationship between velocity and acceleration readings). In another embodiment, vehicle speed signals are actually generated from one or more speed sensors coupled to certain parts of the vehicle. For example, a vehicle speed sensor can be coupled to an output shaft of the transmission or behind the speedometer. FIG. 1 schematically shows an example where individual wheel speed sensors 30-36 are coupled to the four wheels of the vehicle and separately report individual wheel speeds. Vehicle speed sensors 30-36 may include electromagnetic elements, optical elements, or any other technology known in the art. It is possible for the vehicle speed signal to be provided to the fuel system control module 50 by an engine control module (ECM).

Incline sensor 38 may include any combination of hardware and/or software components capable of providing an incline signal that is indicative of the incline or slope being experienced by the vehicle. In one embodiment, incline sensor 38 takes measurements that are affected by static acceleration due to gravity; hence, it can provide information regarding the angle at which the vehicle is tilted, with respect to the Earth. Because of the relationship between gravitational acceleration and inclination, various types of accelerometers may be used to determine the incline of the vehicle. It is also possible to use an inclinometer, which is an instrument that measures angles of slope and inclination with respect to gravity by creating an artificial horizon; other names include a tilt sensor, tilt indicator, slope meter, slope gauge, gradient meter, etc. Such a device is sometimes used by vehicle anti-theft systems to guard against illegal towing.

Fuel injector sensor(s) 40 may include any combination of hardware and/or software components capable of providing a fuel usage signal that is indicative of the amount of fuel being consumed by the vehicle. In an exemplary embodiment, one or more fuel injector sensor(s) 40 are coupled to fuel injectors of the engine so that they can monitor the amount of fuel that the fuel injectors deliver to the combustion chamber. The amount of fuel supplied to the engine may be determined by knowing the amount of time the fuel injector stays open, the size of the nozzle or orifice, the pressure that the fuel is under, etc. and by using lookup tables, algorithms and other techniques known in the art. Any number of different fuel injection systems may be used, including single-point injection systems, multi-point injection systems, sequential multi-port injection systems, etc. It is possible for the fuel usage signal to be provided to the fuel system control module 50 by an engine control module (ECM).

It should be appreciated that the foregoing examples only include some of the potential sensors that could be used with fuel system control module 50. Other sensors that could be used are: oxygen sensors, throttle position sensors, manifold absolute pressure (MAP) sensors, crankshaft position sensors, as well as any other sensor that provides information relating to vehicle maneuvering and other actions that could influence dynamic fuel tank conditions. As mentioned above, the various sensors could be electronically coupled to fuel system control module 50 according to a variety of ways and do not need to be directly connected as schematically illustrated in the drawing. Moreover, these and other sensors may be shared by other devices, components, modules, systems, etc. located throughout the vehicle.

Fuel system control module 50 is an electronic device that may be used to control one or more aspects of the vehicle's fuel supply. This could include controlling and driving a fuel pump, as well as determining the fuel level in vehicle fuel tank 12, for example. In the particular embodiment shown here, fuel system control module 50 receives a variety of inputs from sensors 20-40, performs different tasks, and outputs a fuel level reading to fuel gauge 52 so that the driver can be informed as to the amount of fuel currently in the tank. Fuel system control module 50 may include a central processing unit (CPU), input and output components (I/O devices), electronic memory, and any other hardware and/or software components known in the art. In some embodiments fuel system control module 50 is a stand alone electronic module, while in others it is integrated, combined, or otherwise shared with other electronic devices.

Fuel gauge 52 displays the level of fuel remaining in fuel tank 12. Any number of different fuel gauges may be used, including various types of analog and digital gauges known in the art. In one particular embodiment, fuel gauge 52 may be somewhat adjustable so that it can be compensated for the shape of the tank by comparing the measured fuel level readings to a calibration curve or the like. The type of fuel gauge used may vary depending on the particular application; for instance, size restrictions, lighting requirements, power supply, driving environment (highway, high moisture, off-road, etc.), or cosmetic appearance such as color, graphic, pointer style, digital, analog, etc. could all affect gauge design. The system and method described herein can be used with any suitable fuel gauge, and is not limited to any particular design or type.

Figure 2:
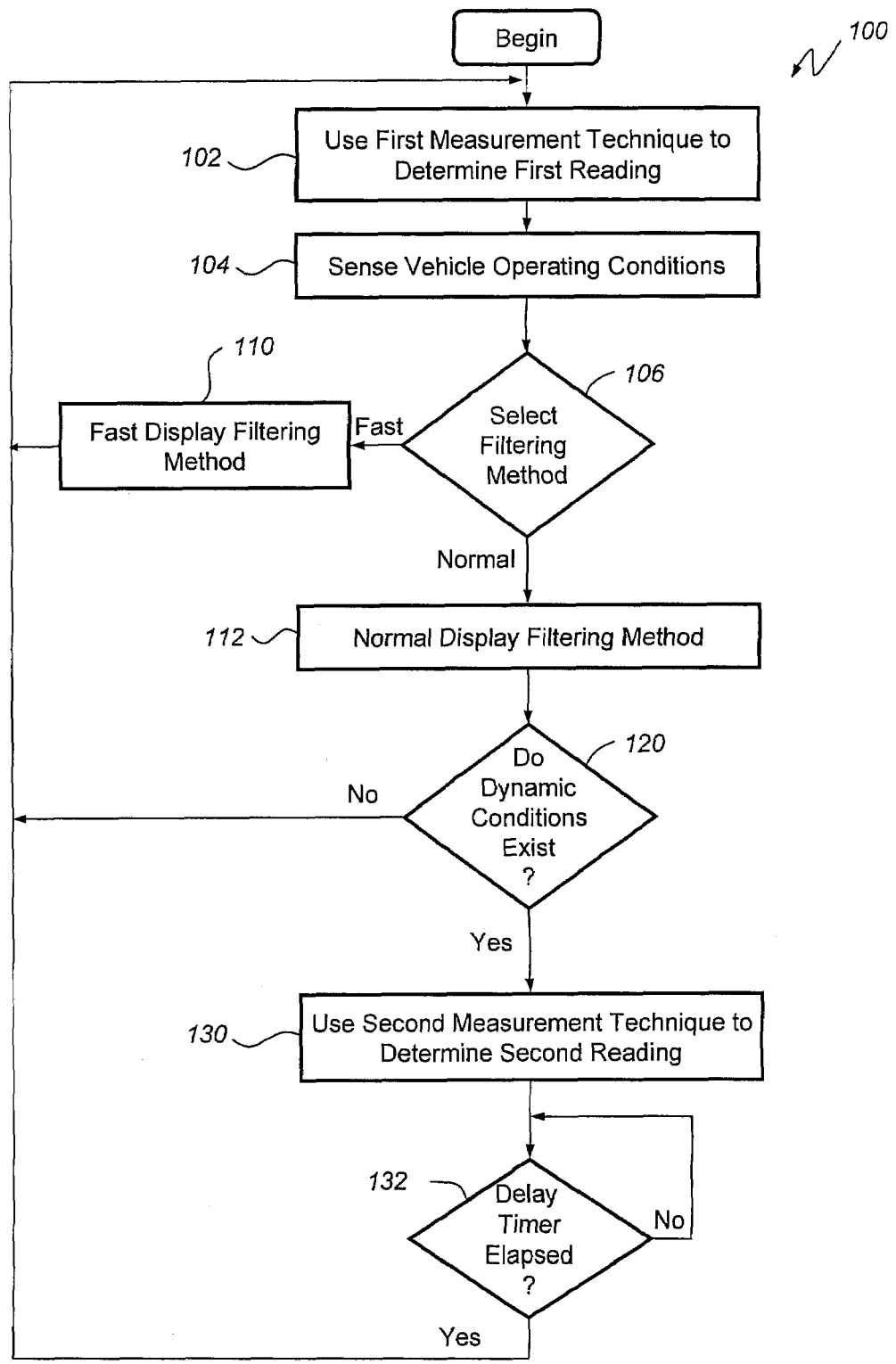
FIG. 2 is a flowchart illustrating an exemplary method for measuring the fuel level in a vehicle fuel tank, and may be used with the system shown in FIG. 1.

Turning to FIG. 2, there is shown an exemplary embodiment of a method 100 for measuring a fuel level. Although not limited to such use, method 100 is particularly well suited for reducing fuel gauge fluctuations and errors in instances where the fuel is sloshing, splashing or otherwise experiencing dynamic conditions, and can do so across a wide fuel tank volume range. Such dynamic conditions may be caused by vehicle maneuvers involving braking, accelerating, cornering, driving on an incline or by the particular design of the fuel tank, to cite a few examples. Various filtering techniques have been employed to process fuel level readings, however, if a technique relies on heavy or significant filtering the fuel gauge display can lag the actual level in the fuel tank.

In step 102, the method uses a first measurement technique to determine a first reading. The first reading can be determined in a number of different ways using a number of different techniques. In one embodiment, a first measurement technique involves receiving a fuel level signal from fuel level sensor 20 and using that data to determine a first reading. This reading is sometimes called a 'raw fuel level reading' because it has not yet been subjected to any filtering methods. Other methods and techniques could also be used, including those that provide fuel level readings in terms of a height, weight, volume, or some other reading.

Next, step 104 senses one or more vehicle operating conditions. The types of vehicle operating conditions and the methods for determining them can vary. For example, step 104 can query transmission sensor 22 to determine if the vehicle is in park, drive, reverse, etc. If the vehicle is in park, for example, it is likely that the contents of fuel tank 12 are not experiencing much disturbance and that a fast filtering technique can be used to process the corresponding fuel level readings, as will be explained. Other vehicle operating conditions can be sensed or determined from one or more of the sensors described above, including engine output sensor 24, acceleration sensor 26, yaw rate sensor 28, vehicle speed sensors 30-36, incline sensor 38, fuel injector sensors 40, etc. It should be appreciated that any input or information regarding vehicle operating conditions that could possibly impact the stability, volatility, or dynamic nature of the fuel within fuel tank 12 could be gathered and used.

Step 106 then uses the information previously gathered to select a particular filtering technique. In one particular embodiment, this step uses the vehicle operating condition information collected in step 104 to select between a normal display filtering method (step 110) and a fast display filtering method (step 112), although other filtering and display techniques could also be used. One of the differences between these methods is the amount of filtering delay that exists between the time that fuel level sensor 20 provides raw fuel level readings and the time that fuel gauge 52 updates its display. As is appreciated by those skilled in the art, the fast display filtering method may use fewer filtering steps and a smaller time constant (e.g., 5 sec); an approach that may be suitable for more static fuel conditions such as when the vehicle is in park. Some examples of fast display filtering techniques that could be used are a filter coefficient approach and a second-order lag filter, to name a few. After the fast display filtering step 110 is performed and fuel gauge 52 is updated with the new readings, the method can loop back to the beginning and start again. If the vehicle operating conditions suggest that the vehicle is being driven or is otherwise experiencing more turbulent fuel conditions, then a normal display filtering method could be used, step 112. After the normal display filtering step 112 is performed and fuel gauge 52 is updated with the new readings, the method may evaluate vehicle operating conditions that would result in further dynamic fuel conditions and take appropriate steps to address such conditions.

According to one embodiment, the method could also check to see if any conditions exist that could prevent the accurate calculation of the fuel level; for example, if the fuel level was within a deadband. A 'deadband' generally refers to those fuel levels that are either very low (i.e., close to an empty tank) or very high (i.e., close to a full tank). For reasons already explained, it can be challenging for certain types of fuel level sensors, such as float-type sensors, to provide exact and accurate fuel level readings in the deadbands. Hence, one approach is to avoid providing an exact quantitative reading and instead to provide a warning (e.g., a low fuel light or an audible warning) when the fuel level is at or below a certain value. Once the fuel level transitions outside of the deadband, normal fuel level sensing operation may continue. It should be appreciated that this deadband check is optional and that it may occur at any number of different points in exemplary method 100, including between steps 106 and 112, for example.

Next, step 120 determines if any dynamic conditions exist in the vehicle fuel tank that may warrant using a second measurement technique instead of the more conventional first technique described above. For example, if the vehicle is engaging in aggressive cornering maneuvers or if it is driving up or down a steep incline, then the fuel is expected to shift, slosh, splash or otherwise be displaced inside fuel tank 12. These types of dynamic conditions may make it difficult for a conventional fuel level sensor to provide an accurate fuel level reading using standard techniques. In order to detect the existence or presence of certain dynamic conditions, any combination of inputs from sensors 20-40, or any other sensors for that matter, could be used.

In one embodiment, step 120 evaluates engine output signals from engine output sensor 24 to determine if any dynamic fuel conditions are likely to exist. The engine output signals may be used to determine rates of change or absolute values relating to engine torque, engine speed, or some other engine output parameter. If, for example, the engine output signal indicates a change in engine torque that exceeds ±25 nm/s, then step 120 may determine that dynamic conditions are likely to exist in fuel tank 12. In another embodiment, step 120 evaluates yaw rate signals from yaw rate sensor 28 to determine the likelihood of dynamic fuel conditions. If the yaw rate exceeds 0.079 gravity, for example, then step 120 may conclude that the vehicle is turning at a sufficiently high rate that is likely to produce a lot of sloshing or shifting of fuel in fuel tank 12. In another embodiment, vehicle speed signals from one or more vehicle speed sensors 30-36 are used to evaluate the conditions within the fuel tank. If the vehicle speed signals indicate a rate of change in the vehicle's velocity (i.e., the vehicle's acceleration) that exceeds ±5 km/h/s, then step 120 may determine that the vehicle is accelerating or decelerating at such a rate that the fuel is likely to be behaving in a dynamic or unstable manner. Of course, information regarding the vehicle's acceleration could also be gleaned from acceleration signals provided by acceleration sensor 26. In yet another embodiment, incline signals from incline sensor 38 may be used to determine if the vehicle is on a hill or other surface that could cause the fuel to temporarily shift to one side of the tank. The preceding examples address only some of the sensors and signals that could be used to determine dynamic conditions in the fuel tank, as others could be used as well.

Step 120 is not limited to using any one particular sensor signal or input, as any combination of signals and information could be used to determine if dynamic conditions exist in the fuel tank. For instance, the engine output signals, yaw rate signals, and vehicle speed signals described above could be evaluated in unison according to some algorithm or method. As mentioned above, the sensor readings could be compared to predetermined thresholds to decide if they exceed some absolute value, rate or change, or other metric. It is also possible for the sensor readings to be compared to some evolving threshold, which may be based one or more previously measured sensor readings, averages, etc. If step 120 concludes that no dynamic conditions exist then the method can loop back to step 102, as the first measurement technique should be sufficient to measure the fuel level in those conditions. If, however, step 120 predicts that the fuel in fuel tank 12 is subject to dynamic conditions, then control of the method proceeds to step 130.

In step 130, a second measurement technique is used to determine a second reading and update fuel gauge 52 accordingly. The second measurement technique should be designed to accurately measure fuel levels in situations where the fuel is sloshing around or otherwise experiencing dynamic conditions. According to one particular embodiment, the second measurement technique includes receiving a fuel usage signal from fuel injector sensors 40 so that it can estimate the amount of fuel that is consumed over a certain period of time; a so-called 'consumption-based technique'. Stated differently, instead of using a conventional fuel level sensor to determine the fuel level during dynamic fuel tank conditions, a consumption-based approach keeps track of the amount of fuel used during this unstable period and then subtracts the fuel usage amount from the last registered reading. For instance, the last fuel level reading or an average of fuel level readings could be stored or saved as a base value. Next, fuel usage signals from fuel injector sensors 40 could be used to estimate the amount or volume of fuel used over the dynamic period of time—a fuel usage amount. As long as the dynamic conditions persist, the fuel level can be determined by subtracting the fuel usage amount from the base value. Once the dynamic conditions cease, method 100 could return to a normal or conventional fuel level measurement approach, such as that used in step 102, and the fuel usage amount would be reset to zero. Skilled artisans will appreciate that other sensors and sequences of steps could also be used with a consumption-based technique, including oxygen sensors, throttle position sensors, etc. It is also possible to use other techniques, instead of consumption-based techniques, so long as they are suitable for measuring fuel levels during dynamic fuel tank conditions.

In order to avoid rapidly switching back and forth from one measurement technique to another, step 132 may use a delay timer to ensure that the consumption-based technique is used for a certain duration. Step 132 is optional and allows the dynamic conditions in fuel tank 12 to settle down before returning to a more conventional measurement approach. During this delay timer, which could be 25 seconds for example, the consumption-based technique can be running and sending signals to fuel gauge 52 that are representative of a current fuel level estimate. Step 132 can also employ a fuel level blending function before handing off to step 102. This can avoid, for example, abrupt changes or fluctuations in the displayed fuel level that are attributable to differences in the two measurement techniques. A longer delay timer may be used until a closer or common fuel level value is reached. The blending function can not only provide an accurate fuel level value but also enables a smooth transition as control loops back to the beginning of the method.

Utilization of method 100 not only provides for accurate and reliable fuel level reporting during dynamic periods, it may also enable a relaxation of the restrictions that govern fuel tank design. The more susceptible fuel level measurement is to sloshing, splashing and dynamic conditions, the more restrictions that can be placed on the location, attachment, and specifics of the fuel level sensor. It should be appreciated that FIG. 1 is simply provided to illustrate some of the steps of a particular exemplary embodiment of method 100, and that other sequences and combinations of steps, including ones with more precise and detailed processes, etc., could certainly be used. Individual techniques, steps, processes, etc. that are generally known in the art but are not repeated here in full detail could certainly be used with exemplary method 100.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, instead of indirectly determining the presence of dynamic fuel tank conditions through the use of vehicle operating conditions, slosh or other sensors placed in or on the fuel tank could be used to directly sense dynamic fuel tank conditions. In such an embodiment, a second measurement technique (e.g., the consumption-based technique) could be employed whenever dynamic fuel tank conditions are directly detected. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for measuring a fuel level in a vehicle fuel tank, comprising the steps of:
    (a) using a first measurement technique to determine a first reading;
    (b) receiving a signal from a vehicle sensor that is representative of a vehicle operating condition, evaluating the vehicle operating condition, and using the vehicle operating condition to determine if dynamic conditions exist in the vehicle fuel tank, wherein the vehicle sensor is not a fuel level sensor located in the vehicle fuel tank;
    (c) if dynamic conditions exist in the vehicle fuel tank, then using a second measurement technique that is different than the first measurement technique to determine a second reading; and
    (d) using both the first and second readings to determine the fuel level in the vehicle fuel tank.

2. The method of claim 1, wherein step (a) further comprises using a first measurement technique that includes receiving a fuel level signal from a fuel level sensor to determine the first reading.

3. The method of claim 2, wherein step (a) further comprises using one or more vehicle operating conditions to select from different filtering techniques.

4. The method of claim 3, wherein the different filtering techniques include a fast display filtering algorithm and a normal display filtering algorithm.

5. The method of claim 4, wherein at least one of the fast display filtering algorithm and the normal display filtering algorithm uses a filter coefficient approach.

6. The method of claim 1, wherein the vehicle operating condition(s) are evaluated by using at least one signal selected from the group consisting of: a transmission signal, an engine output signal, an acceleration signal, a yaw rate signal, a vehicle speed signal, and an incline signal.

7. The method of claim 1, wherein step (b) further comprises receiving a yaw rate signal and using the yaw rate signal to determine if dynamic conditions exist in the vehicle fuel tank.

8. The method of claim 1, further comprising the steps of:
    checking to see if the first reading is in a deadband; and
    if the first reading is in a deadband, then displaying a visual or audible warning.

9. The method of claim 1, wherein step (c) further comprises using a second measurement technique that includes receiving a fuel usage signal from a fuel injector sensor to determine the second reading.

10. The method of claim 9, wherein step (c) further comprises using the fuel usage signal and a consumption-based technique to estimate a fuel usage amount and to subtract the fuel usage amount from a previous fuel level reading.

11. A method for measuring a fuel level in a vehicle fuel tank, comprising the steps of:
    (a) receiving a signal from a vehicle sensor that is not a fuel level sensor located in the vehicle fuel tank, and using the signal to determine if dynamic conditions exist in the vehicle fuel tank;
    (b) receiving a fuel usage signal from a fuel injector sensor, and the fuel usage signal is indicative of the amount of fuel being consumed by the vehicle; and
    (c) if dynamic conditions exist in the vehicle fuel tank, then using the fuel usage signal and a consumption-based technique to determine the fuel level in the vehicle fuel tank.

12. The method of claim 11, wherein step (a) further comprises evaluating one or more vehicle operating condition(s) and using the vehicle operating condition(s) to determine if dynamic conditions exist in the vehicle fuel tank.

13. The method of claim 12, wherein the vehicle operating condition(s) are evaluated by using at least one signal selected from the group consisting of: a transmission signal, an engine output signal, an acceleration signal, a yaw rate signal, a vehicle speed signal, and an incline signal.

14. The method of claim 11, wherein step (a) further comprises receiving a yaw rate signal and using the yaw rate signal to determine if dynamic conditions exist in the vehicle fuel tank.

15. The method of claim 11, wherein step (c) further comprises using the fuel usage signal and a consumption-based technique to estimate a fuel usage amount and to subtract the fuel usage amount from a previous fuel level reading.

16. A system for measuring a fuel level in a vehicle fuel tank, comprising:
    a yaw rate sensor for providing a yaw rate signal;
    a fuel level sensor for providing a fuel level signal;
    a fuel injector sensor for providing a fuel usage signal; and
    a fuel system control module coupled to the yaw rate sensor, the fuel level sensor and the fuel injector sensor for receiving the yaw rate signal, the fuel level signal and the fuel usage signal, respectively;
    wherein the fuel system control module uses the yaw rate signal to select between a first measurement technique that determines the fuel level in the vehicle fuel tank with the use of the fuel level signal, and a second measurement technique that determines the fuel level in the vehicle fuel tank with the use of the fuel usage signal.

* * * * *